April 23, 1957 C. F. PAYNE 2,789,708
TRANSPORTATION EQUIPMENT
Filed July 21, 1955 2 Sheets-Sheet 1
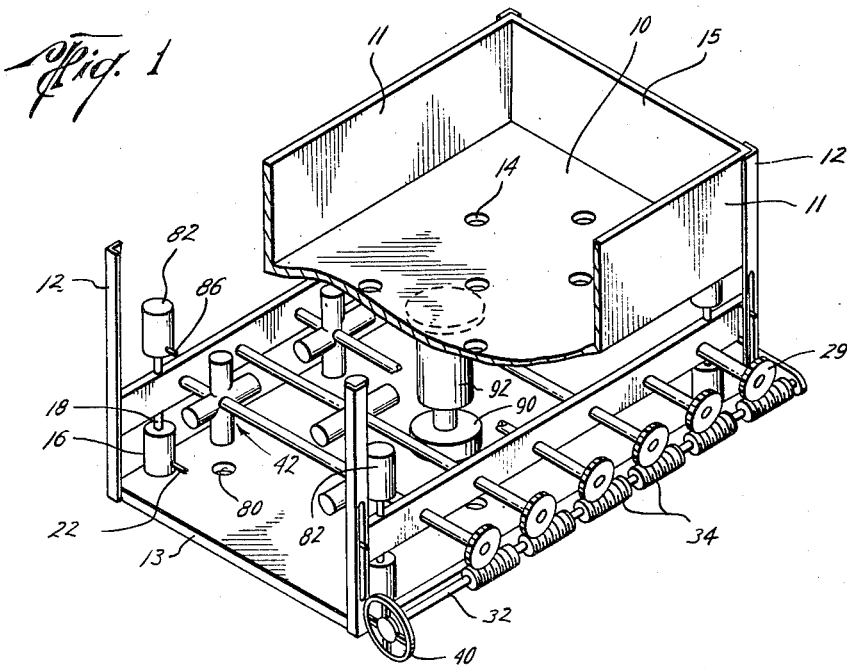
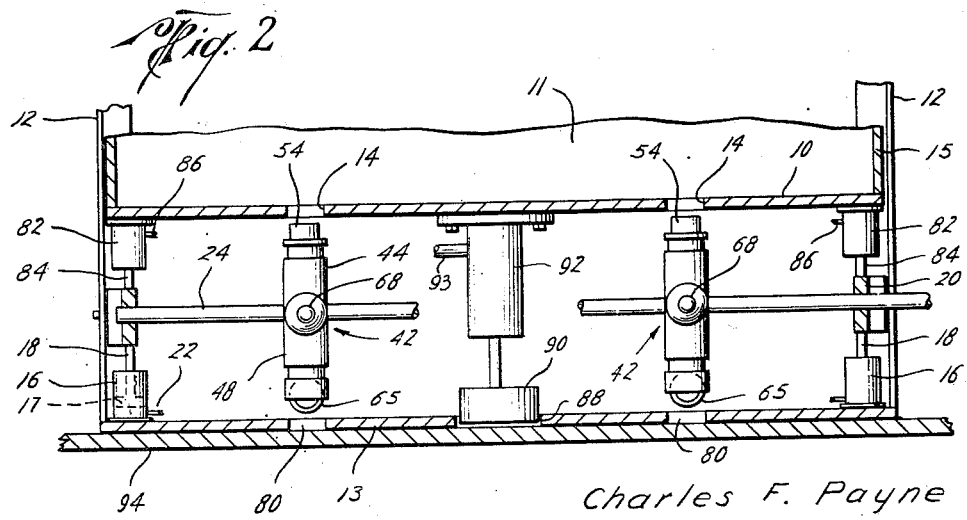
Charles F. Payne
INVENTOR.
BY Charles E. Lightfoot
ATTORNEY

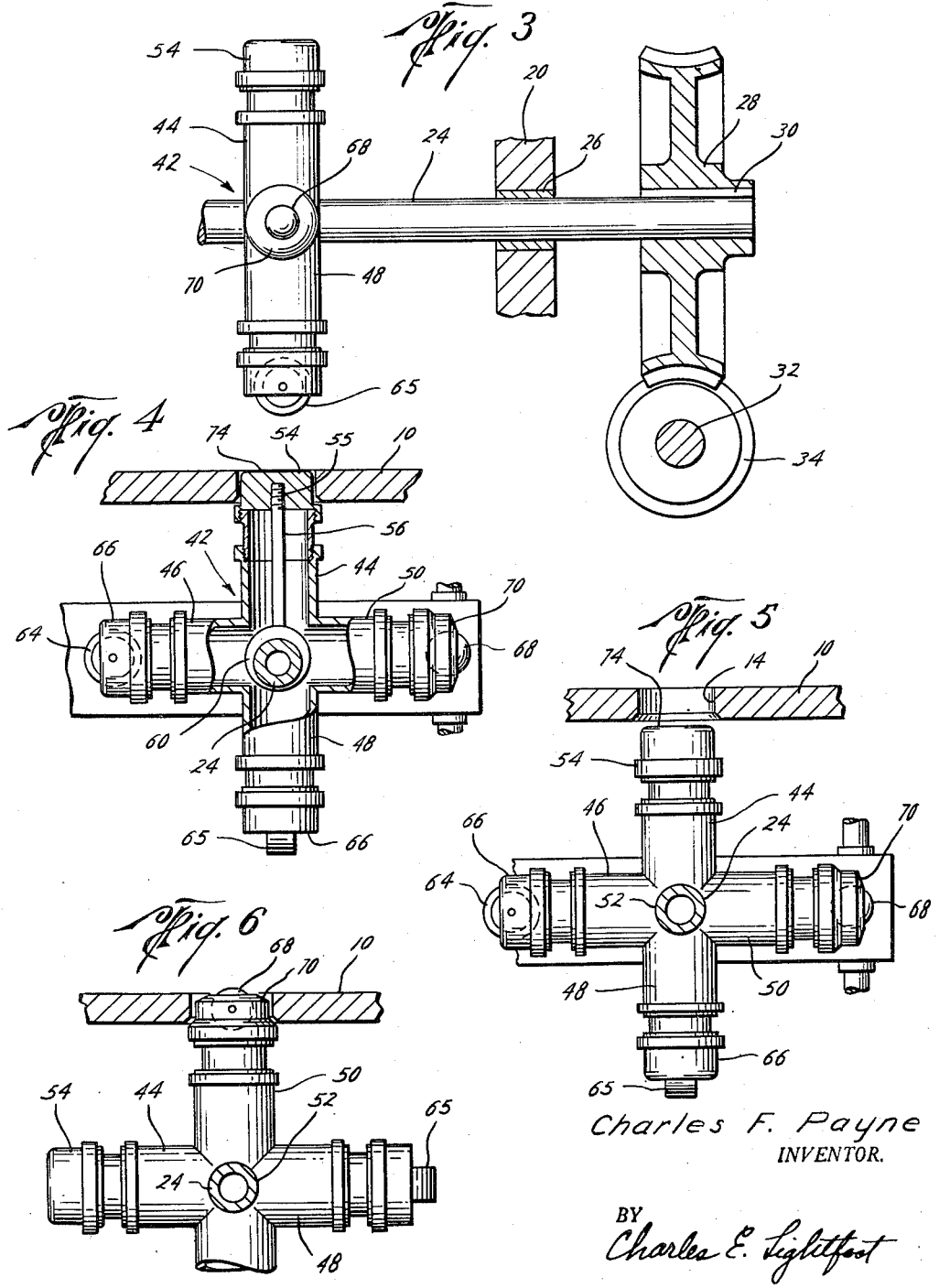

United States Patent Office 2,789,708
Patented Apr. 23, 1957

2,789,708

TRANSPORTATION EQUIPMENT

Charles F. Payne, Houston, Tex.

Application July 21, 1955, Serial No. 523,505

3 Claims. (Cl. 214—84)

This invention relates to transportation equipment and more particularly to mechanism for use in connection with equipment of the kind sometimes referred to as vans, wagon-lits or containers, such as those of the type known as LCL or Less-Carload-Lot containers.

This application is a continuation-in-part of a copending application, Serial No. 459,113, filed by the same applicant on September 29, 1954.

While not limited to such use, the invention finds particular application in connection with container equipment of the type mentioned employed in the transportation of various kinds of goods, and especially in the transportation of heavy or bulky articles which are difficult to handle and move about into the desired positions in such containers.

In the transportation of goods in equipment of the container type, the loading of the containers is often a tedious and time consuming task, especially when the articles being loaded are of irregular shape, bulky, or heavy, making them difficult to move about over the floor of a container. The work of loading of transportation containers is also considerably complicated when it is desired to make the most economical use of the available space by moving the goods about in several different directions to locate them in the most advantageous positions.

A further difficulty in the use of transportation equipment of the container type is presented by the necessity of positioning the containers on and removing the same from vehicles, such as trucks or flat cars, station platforms or other supporting surfaces. The transferring of such containers from one vehicle or platform to another often requires the provision of extensive load handling apparatus.

Heretofore, attempts have been made to facilitate the loading and unloading of containers by the provision of various systems of conveyors, rollers, or similar means associated therewith, whereby heavy or bulky articles could be moved along the supporting surfaces without lifting. One difficulty encountered in the use of such devices, however, is that they are usually arranged to allow articles to be rolled over the supporting surface in one direction only, and in order to move the articles in some other direction it becomes necessary to slide the articles. Thus, in loading articles into a container whose floor or bed is provided with rollers to facilitate moving the articles longitudinally of the bed, it may be necessary to slide the articles laterally of the bed in order to properly distribute the load and to obtain the maximum use of the available loading space.

Another disadvantage of load handling equipment of the usual type having roller means, or the like, for facilitating the movement of articles over a load supporting floor or bed, is that such means are usually located in fixed relation to the load supporting surface, and projecting above the same, so that there is likelihood of shifting of the lading in transit.

The present invention has for an important object the provision of means for use with the floors of containers, load supporting platforms, or beds, whereby the above disadvantages may be overcome, and by which the movement of articles in any direction over the load supporting surfaces of such containers, platforms or beds is greatly facilitated.

Another object of the invention is to provide load facilitating mechanism for use in connection with containers, load supporting platforms, or the like, and including different types of rotatable load engaging elements and means for moving the same into and out of positions projecting above the load supporting surface for engagement with articles to be moved about on such surface.

A further object of the invention is the provision of load facilitating means for use with containers, load carrying platforms, or the like, and including rotatable load supporting elements which are adapted to be raised and lowered into and out of positions extending through openings in the supporting surface to project above such surface for engagement with articles to be moved over the surface, and also including closure elements which may be moved into position to close the openings when said load supporting elements are not in use.

Another object of the invention is to provide load facilitating mechanism, embodying sets of rollers and balls, and means for supporting the same so that either the rollers or the balls may be moved through openings in a load supporting surface into and out of positions extending above the surface for engagement with articles to be moved about on the surface.

A further object of the invention is the provision of load facilitating mechanism of the kind referred to having pressure fluid means for elevating and lowering the different elements and supporting the same in any position of adjustment relative to the load supporting surface.

Another object of the invention is to provide load facilitating mechanism which is easily applied to load containers, supporting platforms, or beds, of various types, and whose parts are readily assembled, disassembled and adjusted for purposes of repair or replacement.

A further object of the invention is the provision of transportation equipment of the container type embodying extensible and retractible means on the container adapted to be extended below the bottom of the container to support the container for rolling movement along a supporting surface and which may be withdrawn into the container to permit the container to rest directly upon such surface.

Another object of the invention is to provide a transportation container having centrally located means adapted to be engaged with the supporting surface upon which the container is positioned to permit the container to be turned about in any direction on such surface.

A still further object of the invention is to provide load facilitating mechanism of the character described which is of simple design and rugged construction, capable of long withstanding the extreme conditions of hard usage and exposure to which equipment of this type is likely to be subjected.

The above and other important objects and advantages of the invention may best be understood from the following detailed description, constituting a specification of the same, when considered in conjunction with the annexed drawings, wherein—

Figure 1 is a fragmentary, perspective view, illustrating somewhat diagrammatically a preferred embodiment of the invention and showing the same applied to a transportation container;

Figure 2 is a central, longitudinal, cross-sectional view, on a somewhat enlarged scale, of the invention as shown in Figure 1;

Figure 3 is a fragmentary, detail view, partly in cross-section and on an enlarged scale, showing details of construction of a portion of the operating mechanism of the invention;

Figure 4 is an end elevational view, partly broken away, of the invention as illustrated in Figure 3, showing the closure element of the invention in closing position in an opening in the floor of the container;

Figure 5 is a view similar to that of Figure 4, showing the mechanism of the invention with the closure element thereof in lowered position preparatory to the movement of a load engaging element into position for movement of the same to load engagement position; and Figure 6 is a view similar to that of Figure 4, showing the mechanism of the invention with one of the load-engaging elements extending through the opening in the floor of the container in load-engaging position.

Referring now to the drawings in greater detail, the invention is illustrated by way of example in its application to a transportation container having a floor or bed 10, which is supported by suitable means, such as a frame having upright frame elements 12, secured at their upper ends to the platform and whose lower ends are suitably connected to a bottom or base 13. In the present illustration the uprights 12 take the form of angle members forming vertical guides for the mechanism by which the load engaging elements of the invention are supported. The container is also provided with the usual side and end walls 11 and 15, respectively.

The floor or bed 10 is provided with suitably spaced rows of openings 14, therethrough, through which the load engaging elements may be extended for engagement with articles which are to be moved about over the floor.

Beneath the floor 10 lifting means such as the pressure fluid cylinders 16 are suitably supported on the base 13, in which cylinder pistons 17 are disposed which carry piston rods 18 projecting upwardly into engagement at their upper ends with cross members 20, whose opposite end portions are in vertical sliding engagement with the uprights or guides 12. Each of the cylinders 16 may have an inlet pipe, such as that indicated at 22 near its lower end through which pressure fluid from a source of pressure not shown, may be supplied to or exhausted from the cylinder to elevate or lower the piston therein.

A rod or tubular shaft 24 is supported for rotation beneath each row of the openings in suitable bearings, such as that shown at 26 in Figure 3, carried by the cross members 20. Each shaft 24 has an end portion extending beyond one of the cross members, which is provided with a gear 28, which is suitably keyed thereon, as indicated at 30 in Figure 3.

An operating shaft 32, disposed parallel to the cross members 20 is supported for rotation in suitable bearings attached to the uprights 12, and on this shaft worms 34 are carried for rotation with the shaft in intermeshing engagement with the gears 29, whereby all of the gears will be rotated simultaneously upon rotation of the operating shaft. Suitable means, such as the hand wheel 40, on the shaft 32, is provided whereby the same may be readily rotated.

Each of the shafts 24 carries a number of cross heads 42, there being one such cross head beneath each of the openings 14. These cross heads may be of tubular formation having four arms 44, 46, 48 and 50, respectively, and an opening 52 extends centrally through each cross head through which the shaft 24 is slideably extended.

On the outer end of the arm 44 a cap 54 is threaded, which has a central internally threaded opening 55 into which a screw 56 is threaded, said screw extending inwardly from the cap. At its inner end the screw 56 has an enlargement 60 through which an eccentrically disposed opening is formed through which the shaft 24 is slideably fitted. By this arrangement the screw 56 may be loosened to permit the crosshead to be moved to any desired position of adjustment on the shaft and when the screw is again tightened the crosshead will be held against movement relative to the shaft. In this manner the crossheads may be adjusted on the shafts so that one of the arms 44, 46, 48 or 50 is accurately positioned in axial alignment with the corresponding opening 14 of the platform, and upon rotation of the shafts 24 90 degrees, another one of the arms of each crosshead will then be disposed in axial alignment with the corresponding opening.

One or more rollers 64 is rotatably carried by the arm 46 of each crosshead, at the outer end of the arm, in suitable bearing means, such as that indicated at 66, and one or more similar rollers 65 is rotatably carried by the arm 48, the axes of the rollers 64 being positioned substantially at right angles to the axes of the rollers 65. A ball 68 is rotatably carried at the outer end of the arm 50 in suitable bearing means such as that shown at 70. The bearing means 66 and 70 may be removably attached to the respective arms to facilitate replacement when necessary.

The cap 54 is of a size to fit snugly in the opening 14 to close the same when moved into position therein.

In making use of the equipment, constructed as described above, the closure caps 54 may be positioned in the openings 14 of the platform so that their outer end faces 74 are substantially flush with the upper surface of the platform, thus closing the openings, whereby the floor is adapted for the carrying of such substances as sand or grain without danger of leakage of the same through the openings. Should it be desired to move relatively heavy objects over the surface of the floor the crossheads may be lowered by exhausting the pressure fluid from the cylinders 16, permitting the cross members 20 to move downwardly and withdrawing the closure caps 54 from the openings. The handwheel may then be rotated to cause the shafts 24 to turn 90 degrees to move the arms 46 into axial alignment with the openings. By introducing pressure fluid into the cylinders the cross members 20 may then be elevated to extend the rollers 64 above the upper surface of the floor. With the rollers thus located, objects may be rolled over the floor to the desired location. When the floor has been loaded in this manner, the crossheads may be lowered to withdraw the rollers, permitting the objects to rest directly on the floor.

Should it be desired to load objects on the floor and to uniformly distribute the load thereon, the crossheads may be lowered and rotated to position the arms 50 in alignment with the openings and then raised again to position the balls 68 at a desired elevation above the upper surface of the floor, whereupon objects may be rolled in any direction over the floor to position them for best distribution of the load. The crossheads may then be lowered, if desired, to withdraw the balls and permit the objects to rest directly on the floor. In order to unload objects from the floor the rollers or balls may be positioned above the surface of the platform in the manner previously described to permit rolling of the object over the floor.

In order to permit the container to be rolled about on a supporting surface, such as a platform, flat car, truck bed, or the like, the bottom 13 is provided with openings 80, spaced to correspond with the openings 14 of the floor 10, and suitable means, such as the pressure fluid cylinders 82 similar to cylinders 16, previously described are positioned above the cross members 20 and connected thereto by piston rods 84. The cylinders 82 likewise provided with inlet pipes 86 thorugh which pressure fluid may be supplied to or exhausted from the cylinders in the same manner as described in connection with the cylinders 16, whereby the cross members may be moved downwardly to extend the rollers 64 or 65 or the balls 68 through the openings 80, to support the container for rolling movement over the supporting surface.

The bottom or base 13 also has a central opening 88 therethrough through which a plunger 90 may be extended, and within the container a pressure fluid cylinder 92 is located in which the plunger is movable. The cylinder 92 is connected with a source of fluid under pressure, as by means of an inlet pipe 93, and is operable in the same manner as the cylinders 16 and 82. By operation of the cylinder 92 the plunger 90 may be extended downwardly through opening 88 to engage the supporting surface, indicated at 94 in Figure 2, whereby the container may be supported centrally to permit the container to be readily rotated horizontally, thus enabling the container to be quickly turned to any desired position. By this construction the container may be easily turned independently of the rollers 64 or 65, even when heavily loaded.

It will thus be seen that the invention provides load facilitating means which is easily operated and which occupies an out-of-the-way position when not in use.

While the invention has been disclosed herein in connection with a certain specific embodiment of the same, it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secure by Letters Patent is:

1. Transportation equipment comprising a body having a bottom wall and a floor spaced above said wall, said floor and wall having horizontally spaced, vertically aligned, openings therethrough, a shaft extending horizontally between said floor and wall, means supporting the shaft for axial rotation, load supporting elements mounted on the shaft for rotation therewith and positioned to be moved into and out of axial alignment with corresponding openings in the floor and wall and means for moving the shaft vertically to move said load supporting elements to one position extending above said floor and to another position extending below said wall.

2. Transportation equipment comprising a body having a bottom wall and a floor spaced above said wall, said floor and wall having horizontally spaced, vertically aligned, openings therethrough, a shaft extending horizontally between said floor and wall, means supporting the shaft for axial rotation, an arm mounted on the shaft for rotation therewith and positioned to be moved into and out of axial alignment with corresponding openings in the floor and wall, and means for moving the shaft vertically to move said arm to one position extending above said floor and to another position extending below said wall.

3. Transportation equipment comprising a body having a bottom wall and a floor spaced above said wall, said floor and wall having horizontally spaced, vertically aligned, opening therethrough, a shaft extending horizontally between the floor and wall, means supporting the shaft for axial rotation, radially extending arms mounted on the shaft for rotation therewith, said arms being positioned to be moved to upper positions to enter the openings in said floor and to lower positions to enter the openings in said wall, and means for moving the shaft vertically to extend said arms through the openings in the floor when the arms are in said upper positions and to extend the arms through the openings in said wall when the arms are in said lower positions.

References Cited in the file of this patent

UNITED STATES PATENTS

| | | |
|---|---|---|
| 1,100,547 | Douglass | June 16, 1914 |
| 1,865,805 | Umberto | July 5, 1932 |
| 2,091,789 | Maussnest | Aug. 31, 1937 |
| 2,169,446 | Hester | Aug. 15, 1939 |
| 2,179,047 | McMurry | Nov. 7, 1939 |
| 2,360,133 | Houssiere | Oct. 10, 1944 |